United States Patent
Hattori

(10) Patent No.: US 8,524,108 B2
(45) Date of Patent: Sep. 3, 2013

(54) MAGNETIC PARTICLE AND METHOD OF PREPARING THE SAME, AND MAGNETIC RECORDING MEDIUM

(75) Inventor: Yasushi Hattori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 285 days.

(21) Appl. No.: 13/010,524

(22) Filed: Jan. 20, 2011

(65) Prior Publication Data

US 2011/0175014 A1    Jul. 21, 2011

(30) Foreign Application Priority Data

Jan. 21, 2010 (JP) ................. 2010-010874
Jul. 26, 2010 (JP) ................. 2010-166986
Jan. 12, 2011 (JP) ................. 2011-003606
Jan. 20, 2011 (JP) ................. 2011-009861

(51) Int. Cl.
*G11B 5/712* (2006.01)

(52) U.S. Cl.
USPC ............. 252/62.63; 252/62.55; 252/62.51 R

(58) Field of Classification Search
USPC ........................... 252/62.56–62.64
See application file for complete search history.

(56) References Cited

U.S. PATENT DOCUMENTS

| 5,648,160 A | 7/1997 | Kishimoto et al. |
| 5,858,265 A * | 1/1999 | Ataie et al. ............ 252/62.63 |
| 7,497,892 B2 | 3/2009 | Hattori |
| 2007/0227624 A1 | 10/2007 | Hattori |

FOREIGN PATENT DOCUMENTS

| JP | 2659957 B2 | 1/1989 |
| JP | 05-144623 A | 6/1993 |
| JP | 06-150293 A | 5/1994 |
| JP | 08-138921 A | 5/1996 |
| JP | 2001-093719 A | 4/2001 |
| JP | 2006-108282 A | 4/2006 |

OTHER PUBLICATIONS

Y. Inaba, et al., "Preliminary study of Hard/Soft-stacked Perpendicular Recording Media", the Journal of the Magnetics Society of Japan, 2005, pp. 239-242, vol. 29, No. 3.

\* cited by examiner

*Primary Examiner* — Carol M Koslow
(74) *Attorney, Agent, or Firm* — Sughrue Mion, PLLC

(57) ABSTRACT

An aspect of the present invention relates to a magnetic particle obtained by heat-treating a hexagonal ferrite magnetic material in reducing atmosphere containing hydrocarbon gas.

20 Claims, No Drawings

MAGNETIC PARTICLE AND METHOD OF PREPARING THE SAME, AND MAGNETIC RECORDING MEDIUM

CROSS-REFERENCE TO RELATED APPLICATIONS

This application claims the benefit of priority under 35 USC 119 to Japanese Patent Application No. 2010-010874 filed on Jan. 21, 2010, Japanese Patent Application No. 2010-166986 filed on Jul. 26, 2010, Japanese Patent Application No. 2011-003606 filed on Jan. 12, 2011, and Japanese Patent Application No. 2011-009861 filed on Jan. 20, 2011, which are expressly incorporated herein by reference in their entirety.

BACKGROUND OF THE INVENTION

1. Field of the Invention

The present invention relates to a magnetic particle and to a method of preparing the same. More particularly, the present invention relates to a magnetic particle that has magnetic characteristics suited to magnetic recording and that can be employed in a particulate magnetic recording medium, and to a method of preparing the same.

The present invention further relates to a particulate magnetic recording medium comprising the above magnetic particle.

2. Discussion of the Background

Conventionally, ferromagnetic metal powders have been primarily employed in the magnet layers of high-density recording-use magnetic recording media. These ferromagnetic metal powders are comprised of acicular particles consisting of a main material primarily in the form of iron. Particle size reduction and increased coercive force are sought for high-density recording. These ferromagnetic metal powders are employed in magnetic recording media for various uses.

Since the quantity of information being recorded has been increased in recent years, high-density recording is constantly required of magnetic recording media. However, in achieving ever higher density recording, limits to the improvement in ferromagnetic metal powders have begun to appear. That is because as the particle size of a ferromagnetic metal powder decreases, thermal fluctuation ends up causing superparamagnetism, precluding use in magnetic recording media.

By contrast, hexagonal ferrite magnetic material has high crystal magnetic anisotropy due to its crystalline structure and thus exhibits good thermal stability. Therefore, even with size reduction, it is possible to maintain good magnetic characteristics suited to magnetic recording. However, in magnetic materials having high crystal magnetic anisotropy such as ferrite magnetic material, the switching magnetic field increases, resulting in high coercive force. This is problematic in that a large external magnetic field is required for recording, compromising recording properties.

For example, Japanese Patent No. 2,659,957, which is expressly incorporated herein by reference in its entirety, proposes reducing a substituted ferromagnetic ferrite powder in a hydrogen gas flow as a means of improving the recording properties of a hexagonal ferrite magnetic powder. Japanese Patent No. 2,659,957 describes reducing a substituted ferromagnetic ferrite powder in a hydrogen gas flow to obtain a magnetic powder of suitable coercive force and high saturation magnetization.

Additionally, the Journal of the Magnetics Society of Japan 29, 239-242 (2005), which is expressly incorporated herein by reference in its entirety, describes attempts that have been made to reduce the switching magnetic field by stacking a soft magnetic layer and a hard magnetic layer formed as vapor phase films on a nonmagnetic inorganic material to produce exchange coupling interaction.

In metal thin-film magnetic recording media such as HD media, a glass substrate capable of withstanding high temperatures during vapor deposition is normally employed as the support. By contrast, particulate magnetic recording media affording good general-purpose properties and employing inexpensive organic material supports have been proposed in recent years, and are widely employed as video tapes, computer tapes, flexible disks, and the like. Accordingly, in order to enhance recording properties when hexagonal ferrite magnetic material is employed as the magnetic powder in these particulate magnetic recording media, it is conceivable to employ the technique described in the Journal of the Magnetics Society of Japan 29, 239-242 (2005) to lower the switching magnetic field of the hexagonal ferrite magnetic material. However, the nonmagnetic organic material support that is normally employed in these particulate media has poor resistance to heat. Thus, it is difficult to employ the technique described in the Journal of the Magnetics Society of Japan 29, 239-242 (2005) in which the support is exposed to high temperatures during vapor phase film formation. Further, the present inventor studied the technique described in Japanese Patent No. 2,659,957. As a result, it was revealed that the crystalline structure of the hexagonal ferrite contributing to high thermal stability was deteriorated following reduction processing.

Accordingly, an aspect of the present invention provides for a magnetic particle that can be applied to particulate magnetic recording media and that has both high thermal stability and good recording properties.

The present inventor conducted extensive research into achieving the above-stated magnetic particle, resulting in the discovery that by heat-treating a hexagonal ferrite magnetic material in reducing atmosphere containing hydrocarbon gas, it was possible to adjust a coercive force to within a range suitable for recording while maintaining thermal stability. The present inventor surmised the reasons for this to be as follows.

When a hexagonal ferrite magnetic material is heat-treated in reducing atmosphere containing hydrocarbon gas, the hydrocarbon is oxidized as the hexagonal ferrite magnetic material is reduced. This produces carbon and/or carbides (which are referred to collectively as "carbon components" in the present invention). These are thought to deposit on the surface of the magnetic material. Since these carbon components are present on the surface of the magnetic material, the hexagonal ferrite magnetic material is not reduced completely through to the interior. As a result, a core/shell structure with hexagonal ferrite at the core and the reduction product thereof as the shell is thought to exist following the above heat-treatment in the reducing atmosphere. This core portion and shell portion are thought to exchange-couple. The spin orientation of the shell portion changes first in a manner corresponding to the change in the external magnetic field, thereby enabling a change in the spin orientation of the core portion with which the shell portion is exchange-coupled. It is thought that as a result, the switching magnetic field of the magnetic particle as a whole decreases (the coercive force decreases). However, the high thermal stability due to the crystalline structure of the hexagonal ferrite that has not been reduced in the interior of the particle can remain. The present inventor presumes that a magnetic particle that both exhibits high thermal stability and good recording properties is thus achieved.

By contrast, in an investigation conducted by the present inventor, in reducing atmosphere not containing hydrocarbon gas (for example, atmosphere containing carbon monoxide or the hydrogen atmosphere described in Japanese Patent No. 2,659,957), the reduction treatment caused the coercive force of the magnetic material to drop precipitously, making it difficult to obtain a magnetic material of a coercive force suited to high-density recording. This is thought to be because the hydrogen or carbon monoxide itself is oxidized when the hexagonal ferrite magnetic material is reduced, becoming water or carbon dioxide, respectively, and exiting the system. It is thought that, in the above system, a decomposition product is not formed on the surface of the hexagonal ferrite and thus reduction is not inhibited.

The present invention was devised based on the above discovery.

An aspect of the present invention relates to a magnetic particle, which is obtained by heat-treating a hexagonal ferrite magnetic material in reducing atmosphere containing hydrocarbon gas.

The above magnetic particle may be obtained by subjecting a hexagonal ferrite magnetic material having a coercive force of equal to or higher than 230 kA/m to the above heat-treatment.

The above magnetic particle may comprise a carbon component.

The above carbon component may be graphite.

The above reducing atmosphere may be mixed gas atmosphere of hydrocarbon gas and inert gas.

The above hydrocarbon gas may be at least one selected from the group consisting of methane and ethane.

The above magnetic particle may have a coercive force of equal to or higher than 120 kA/m but less than 230 kA/m.

The above magnetic particle may have thermal stability in the form of a gradient of decay of magnetization over time of equal to or less than 0.005 (1/ln(s)).

The above magnetic particle may have thermal stability in the form of a difference of a decay rate A and a decay rate B, B-A, ranging from 0.0001 to 0.001, wherein the decay rate A is measured by saturating magnetization of the magnetic particle with an external magnetic field of 40,000 Oe at a temperature of 300 K, subsequently changing the external magnetic field to −600 Oe, and measuring the decay rate based on a time at which a demagnetizing field reaches 600 Oe, and the decay rate B is measured by heating the magnetic particle of which the decay rate A has been measured to 320 K at a rate of temperature increase of 5° C./minute, maintaining the magnetic particle for 10 minutes at that temperature, subsequently cooling the magnetic particle to 300 K at a rate of temperature decrease of 5° C./minute, and measuring the decay rate by the same method as that of the decay rate A.

A further aspect of the present invention relates to a magnetic particle, which is comprised of a hexagonal ferrite magnetic material in which α-Fe and a carbon component are detected by X-ray diffraction analysis.

In the above magnetic particle, a quantity of α-Fe detected by X-ray diffraction may range from 0.2 to 1.0 weight percent.

The carbon component may be graphite.

The above magnetic particle may have a coercive force of equal to or higher than 120 kA/m but less than 230 kA/m.

The above magnetic particle may have thermal stability in the form of a gradient of decay of magnetization over time of equal to or less than 0.005 (1/ln(s)).

The above magnetic particle may have thermal stability in the form of a difference of a decay rate A and a decay rate B, B-A, ranging from 0.0001 to 0.001, wherein the decay rate A is measured by saturating magnetization of the magnetic particle with an external magnetic field of 40,000 Oe at a temperature of 300 K, subsequently changing the external magnetic field to −600 Oe, and measuring the decay rate based on a time at which a demagnetizing field reaches 600 Oe, and the decay rate B is measured by heating the magnetic particle of which the decay rate A has been measured to 320 K at a rate of temperature increase of 5° C./minute, maintaining the magnetic particle for 10 minutes at that temperature, subsequently cooling the magnetic particle to 300 K at a rate of temperature decrease of 5° C./minute, and measuring the decay rate by the same method as that of the decay rate A.

A still further aspect of the present invention relates to a method of preparing a magnetic particle, which comprises heat-treating a hexagonal ferrite magnetic material in reducing atmosphere containing hydrocarbon gas.

The above reducing atmosphere may be mixed gas atmosphere of hydrocarbon gas and inert gas.

The above hydrocarbon gas may be at least one selected from the group consisting of methane and ethane.

The above hexagonal ferrite magnetic material may be a hexagonal ferrite magnetic material having a coercive force of equal to or higher than 230 kA/m.

The above heat-treatment may yield a magnetic particle having a coercive force lower than that of the hexagonal ferrite magnetic material prior to the heat-treatment.

The above heat-treatment may yield a magnetic particle having a coercive force of equal to or higher than 120 kA/m but less than 230 kA/m.

The above heat-treatment may be conducted at a temperature ranging from 200 to 400° C.

A still further aspect of the present invention relates to a magnetic recording medium comprising a magnetic layer comprising a ferromagnetic powder and a binder, wherein the ferromagnetic powder comprises the above magnetic particle.

The present invention can provide a magnetic particle of high thermal stability and of a coercive force suited to recording that can be employed in particulate magnetic recording media.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to:

a magnetic particle, which is obtained by heat-treating a hexagonal ferrite magnetic material in reducing atmosphere containing hydrocarbon gas; and a method of preparing a magnetic particle, which comprises heat-treating a hexagonal ferrite magnetic material in reducing atmosphere containing hydrocarbon gas.

By subjecting a hexagonal ferrite magnetic material to heat-treatment (this processing is also referred to as "reduction processing", hereinafter) in reducing atmosphere containing hydrocarbon gas, the present invention can achieve an improvement in the recording properties of the hexagonal ferrite magnetic material while maintaining the thermal stability thereof.

The present invention will be described in greater detail below.

Hexagonal Ferrite Magnetic Material

Examples of hexagonal ferrite to be subjected to heat-treatment in reducing atmosphere containing hydrocarbon gas are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed; such hexagonal ferrite may be employed in the present invention.

The hexagonal ferrite magnetic material is desirably one of high coercive force, generally referred to as a hard magnetic material. Magnetic materials of high coercive force have high crystal magnetic anisotropy and thus exhibit high thermal stability. Thus, even when reduced in size for high-density recording, there is little reduction in magnetic characteristics due to heat fluctuation. From these perspectives, the hexagonal ferrite magnetic material that is employed is desirably one that has a coercive force of equal to or higher than 230 kA/m, preferably one that has a coercive force of equal to or higher than 235 kA/m. The coercive force of the hexagonal ferrite magnetic materials that are generally available is equal to or lower than about 500 kA/m. By conducting the reduction processing of the hexagonal ferrite magnetic material in reducing atmosphere containing hydrocarbon gas in the present invention, it is possible to improve recording properties (adjust the coercive force to within a range suitable for recording) without losing the thermal stability of the hexagonal ferrite magnetic material.

To achieve high thermal stability, the constant of crystal magnetic anisotropy of the hexagonal ferrite magnetic material is desirably equal to or higher than $0.75 \times 10^{-1}$ J/cc ($0.75 \times 10^6$ erg/cc), preferably equal to or higher than $1 \times 10^{-1}$ J/cc ($1 \times 10^6$ erg/cc). The higher the crystal magnetic anisotropy, the smaller the magnetic particle can be, which is advantageous in terms of electromagnetic characteristics such as the SN ratio. Additionally, when the constant of crystal magnetic anisotropy of the hexagonal ferrite magnetic material exceeds $5 \times 10^{-1}$ J/cc ($0.5 \times 10^7$ erg/cc), even when heat-treatment is conducted in reducing atmosphere containing hydrocarbon gas, the coercive force will be high and recording properties will sometimes deteriorate. Thus, the constant of crystal magnetic anisotropy of the hexagonal ferrite magnetic material is desirably equal to or lower than $5 \times 10^{-1}$ J/cc ($0.5 \times 10^7$ erg/cc).

From the perspective of the recording properties of the magnetic particle obtained by the heat-treatment, the saturation magnetization of the hexagonal ferrite magnetic material desirably ranges from $3.5 \times 10^{-2}$ to $1.0$ $A \cdot m^2/g$ (35 to 1,000 emu/g), preferably from $4.0 \times 10^{-2}$ to $1.0 \times 10^{-1}$ $A \cdot m^2/g$ (40 to 100 emu/g). It can be of any shape, such as spherical or polyhedral. As for the particle size of the hexagonal ferrite magnetic material, for achieving high-density recording, the particle diameter desirably 5 to 200 nm, preferably 5 to 25 nm. The particle size in the present invention can be measured by a transmission electron microscope (TEM). The average value of the particle size in the present invention is defined as the average value of the particle sizes of 500 particles randomly extracted and measured in a photograph taken by a transmission electron microscope.

Reduction Processing

In the present invention, the hexagonal ferrite magnetic material is subjected to heat-treatment (reduction processing) in reducing atmosphere containing hydrocarbon gas. The hydrocarbon is not specifically limited, and can be either a saturated or unsaturated hydrocarbon. Specific examples are saturated hydrocarbons such as methane, ethane, propane, and butane, and unsaturated hydrocarbons such as ethylene and acetylene. From the perspective of ease of handling, methane and ethane are desirable.

As set forth above, the hydrocarbon gas is thought to undergo oxidation as it reduces the hexagonal ferrite magnetic material, forming a carbon component. The fact that this carbon component deposits on the surface of the hexagonal ferrite magnetic material is thought to play a role in reducing just the outer layer portion without reducing the interior portion of the hexagonal ferrite magnetic material. The effect of the hydrocarbon gas can be adequately achieved at a concentration of the hydrocarbon gas in the reducing atmosphere of about 1 volume percent, for example. The reducing atmosphere may also be 100 percent hydrocarbon gas. The reducing atmosphere may contain reducing gas (such as hydrogen or carbon monoxide) in addition to the hydrocarbon gas.

Following heat-treatment in the reducing atmosphere containing hydrocarbon gas, it is also desirable to conduct heat-treatment in atmosphere containing reducing gas (such as hydrogen or carbon monoxide) other than hydrocarbon gas. This is because when reduction with a hydrocarbon is continued, the carbon component forming on the surface becomes thick, causing the particle volume to increase. From this perspective, when attempting to cause the formation of the carbon component to stably progress, the reducing atmosphere is desirably mixed atmosphere of hydrocarbon gas and another gas. From the perspective of causing the reduction to stably progress, the gas that is present with the hydrocarbon gas is desirably inert gas (nitrogen, argon gas, or the like). That is, the reducing atmosphere is desirably mixed gas atmosphere of hydrocarbon gas and inert gas.

From the perspective of reaction efficiency, the reduction processing is desirably conducted by providing a gas flow inlet and a discharge outlet in a reactor and causing a stream of reducing atmosphere gas to continuously flow in while discharging the gas following the reaction. To remove byproducts of reduction processing, the discharge gas can be processed with a scrubber. The heat-treatment temperature during reduction processing is desirably equal to or higher than 200° C. as a temperature of the interior of the reactor. The hydrocarbon gas is of relatively weak reducing strength among reducing gas. At 200° C. and above, the reduction of the outer layer portion of the hexagonal ferrite magnetic material can progress well without requiring an extended period. However, employing an excessively high heat-treatment temperature is undesirable in that it may cause fusion of the microparticulate hexagonal ferrite magnetic material. From the perspective of suppressing fusion of the particles during reduction processing, the heat-treatment temperature during reduction processing is desirably equal to or lower than 400° C. When nitrogen or air of reduced partial oxygen pressure is contained as combined gas in the reducing atmosphere, the heat-treatment temperature during reduction processing is desirably lower than 1,000° C. This is because nitrogen and air of reduced partial oxygen pressure function as reducing agents at high temperature of 1,000° C. and above, and there are cases in which the reduction will progress to the interior of the hexagonal ferrite magnetic material even in atmosphere containing hydrocarbon gas at such temperatures. The reduction processing period is not specifically limited other than that it be set based on the concentration of the hydrocarbon gas in the reducing atmosphere and the like so that a magnetic particle of desired magnetic characteristics is obtained. For example, a period of about 0.1 to 5 hours is suitable. The reduction processing can be conducted by charging the hexagonal ferrite magnetic material to a reaction vessel that is open at the top and positioning the reaction vessel within the reaction chamber. In that case, the powder within the vessel is desirably suitably stirred so that the hexagonal ferrite magnetic material that is positioned in the bottom portion of the reaction vessel is brought into contact with the reducing atmosphere. When employing hydrogen as the reducing agent as disclosed in above-cited Japanese Patent No. 2,659,957, the particles will be readily combustible following reduction processing and must be handled in inert gas. Handling is difficult. By contrast, the present invention is desirable in that a carbon component can be formed on the outer surface of the particles, permitting handling without causing sudden oxidation. To further facilitate handling, it is desirable to oxidize the magnetic particles following the above reduction processing to form an oxide layer on the outermost surface thereof. The oxidation processing can be conducted by a known slow oxidation processes.

The magnetic particle of the present invention that is obtained in the above steps can exhibit lower coercive force than the hexagonal ferrite magnetic material before reduction processing. The coercive force desirably falls within a range of equal to or higher than 120 kA/m but less than 230 kA/m. When the coercive force is excessively low, the effects of adjacent recording bits make it difficult to maintain recorded signals and thus thermal stability deteriorates. When the coercive force is excessively high, recording is precluded. The coercive force is preferably equal to or higher than 160 kA/m but less than 230 kA/m. The coercive force of the hexagonal ferrite magnetic material prior to reduction processing is desirably equal to or higher than 230 kA/m, preferably equal to or higher than 235 kA/m, as set forth above. The magnetic particle of the present invention desirably contains the carbon component on the outer surface thereof as set forth above. The presence of graphite has been found as the carbon component, as set forth in Examples further below.

As indicated in Examples further below, no significant decrease in the saturation magnetization of the magnetic particles due to reduction processing was observed. Accordingly, the saturation magnetization of the magnetic particle of the present invention can be adjusted by means of the saturation magnetization of the hexagonal ferrite magnetic material constituting the starting material particle, and desirably falls within a range of $3.5 \times 10^{-2}$ to $1.0$ A·m²/g (35 to 1,000 emu/g), preferably within a range of $4.0 \times 10^{-2}$ to $1.0 \times 10^{-1}$ A·m²/g (40 to 100 emu/g). A saturation magnetization falling within the above range is advantageous in terms of output.

The diameter of the magnetic particles is desirably 5 to 200 nm, preferably 5 to 25 nm. This is because microparticles are desirable in terms of electromagnetic characteristics such as the S/N ratio. However, when excessively small, the magnetic particles exhibit superparamagnetism and become unsuitable for recording. When the particle diameter exceeds 200 nm, particles that are suitable for recording and reproduction will be present among the magnetic particles without subjecting to the reduction processing. Thus, particles with diameters of equal to or less than 200 nm, at which size it is difficult to obtain magnetic particle suited to recording and reproduction as it is, are desirable.

As set forth further below in Examples, the present invention also provides a magnetic particle comprised of a hexagonal ferrite magnetic material in which α-Fe and a carbon component are detected by X-ray diffraction analysis. As indicated in Examples, the above magnetic particle can exhibit a coercive force that is lower than that of hexagonal ferrite in which α-Fe and a carbon component are not detected. Accordingly, it can achieve good recording properties while maintaining the high thermal stability due to the crystalline structure of hexagonal ferrite. The present inventor surmises that this is because in Fe contained in the hexagonal ferrite, the α-transformation of Fe present mainly on the outer surface portion contributes to adjusting the coercive force. From the perspective of adjusting the coercive force to within the range suited to recording, the quantity of α-Fe detected by X-ray diffraction is desirably 0.2 to 1.0 weight percent, preferably 0.3 to 0.7 weight percent, and more preferably 0.4 to 0.6 weight percent. The present inventor surmises that, in magnetic particles in which a carbon component is detected together with α-Fe, the α-transformation does not progress to the interior of the particle; this contributes to keeping the coercive force within the range suited to recording.

The description of the above magnetic particle and its preparation method can be consulted for details on the magnetic particle described above. Details regarding the thermal stability that is desirably possessed by the magnetic particle of the present invention will be set forth further below based Examples.

The magnetic particle of the present invention is suitable as a magnetic powder for magnetic recording because it can exhibit both good recording properties and thermal stability.

In contrast to the technique described in the above-cited Journal of the Magnetics Society of Japan 29, 239-242 (2005), it can be prepared without requiring high-temperature processing on a support. Thus, the magnetic particle of the present invention permits the formation of a magnetic layer by mixing the magnetic particles with a binder and solvent to prepare a coating liquid, and coating the coating liquid on a support. Accordingly, the magnetic particle of the present invention is suitable for use in particulate magnetic recording media. That is, the present invention also relates to a magnetic recording medium comprising a magnetic layer comprising a ferromagnetic powder and a binder on a nonmagnetic support, wherein the ferromagnetic powder comprises the magnetic particle of the present invention. The magnetic recording medium of the present invention can be a multilayered magnetic recording medium comprising a nonmagnetic layer comprising a nonmagnetic powder and a binder and a magnetic layer comprising the magnetic particle of the present invention and a binder in this order on a nonmagnetic support, and can be a magnetic recording medium comprising a backcoat layer on a surface of a nonmagnetic support opposite to the surface on which the magnetic layer is provided.

As for the thickness structure of the magnetic recording medium of the present invention, the thickness of the nonmagnetic support ranges, for example, from 3 to 80 μm, desirably from 3 to 50 μm, and preferably, from 3 to 10 μm. The thickness of the nonmagnetic layer ranges from, for example, 0.1 to 3.0 μm, desirably 0.3 to 2.0 μm, and preferably, 0.5 to 1.5 μm. The nonmagnetic layer is effective so long as it is substantially nonmagnetic. For example, it exhibits the effect of the present invention even when it comprises impurities or trace amounts of magnetic material that has been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercive force of equal to or less than 7.96 kA/m (100 Oe), it being preferable not to have a residual magnetic flux density or coercivity at all.

The thickness of the magnetic layer desirably ranges from 10 to 80 nm, and preferably 30 to 80 nm. It is desirably optimized based on the saturation magnetization level and head gap length of the magnetic head employed and on the recording signal band. The thickness of the backcoat layer is desirably equal to or less than 0.9 μm, and preferably from 0.1 to 0.7 μm.

For details of the magnetic recording medium of the present invention other than those described above, known techniques regarding magnetic recording media can be applied. For example, as for materials and components constituting the magnetic recording medium as well as the manufacturing method of the magnetic recording medium, reference can be made to paragraphs [0030] to [0145] and Examples of Japanese Unexamined Patent Publication (KOKAI) No. 2006-108282, and paragraphs [0024] to [0039], [0068] to [0116] and Examples of Japanese Unexamined Patent Publication (KOKAI) No. 2007-294084. The above applications are expressly incorporated herein by reference in their entirety. In particular, the techniques described in paragraphs [0024] to [0029] of Japanese Unexamined Patent Publication (KOKAI) No. 2007-294084 are desirably applied, in order to obtain a magnetic recording medium with excellent electromagnetic characteristics by highly dispersing the above magnetic particles.

EXAMPLES

The present invention will be described in detail below based on Examples. However, the present invention is not limited to the examples.

1. Examples and Comparative Examples of Magnetic Particles

Examples 1to 3, Comparative Examples 1 to 3

The barium ferrite ("BaFe" hereinafter) listed in Table 1 below was heat-treated in a reactor in a stream of the reducing atmosphere gas listed in Table 2. In reduction processing, the gas was discharged from the discharge outlet following the reaction while continuously introducing a stream of reducing atmosphere gas through the gas inlet of the reactor. When employing mixed gas as the reducing atmosphere gas, it was mixed to the concentrations given in Table 2 before being fed into the reactor. A Gold Image Reactor (P810C) made by Ulvac-Riko was employed as the reactor, The heating rate was 150° C./min up to the heat-treatment temperature indicated in Table 2. Heat-treatment was conducted for the period indicated in Table 2 at that temperature. Subsequently, the interior of the reactor was cooled to room temperature at a cooling rate of 20° C./min, and the reduction-processed magnetic particles were removed from the reactor in nitrogen gas flow (when a magnetic particle that has been reduction processed in CO-containing air and $H_2$ comes into contact with the air, the entire particle sometimes suddenly oxidizes; thus, all samples were removed under identical conditions). The magnetic particles that had been removed from the reactor were sealed in an acrylic container under nitrogen atmosphere to prevent the above sudden oxidation and evaluated by the following methods.

Evaluation Methods (1) Specific Surface Area $S_{BET}$

Measurement of the $S_{BET}$ given in Table 1 was conducted by the nitrogen adsorption method.

(2) Particle Size Evaluation (Average Plate Diameter, Average Plate Thickness, Average Particle Volume by TEM Observation)

The particles sizes given in Table 1 were measured with a transmission electron microscope (applied voltage 200 kV) made by Hitachi.

(3) Magnetic Characteristics

The magnetic characteristics of the starting material BaFe and the magnetic particles prepared in Examples 1 to 3 and Comparative Examples 1 to 3 were evaluated under conditions of an applied magnetic field of 3,184 kA/m (40 kOe) with a superconducting vibrating sample magnetometer (VSM) made by Tamagawa Co.

(4) Gradient of Decay of Magnetization Over Time, Activation Volume

The gradient of decay of magnetization over time due to demagnetizing fields of 400 Oe (about 32 kA/m) and 600 Oe (about 48 kA/m) corresponding to the demagnetizing fields to which a magnetic recording medium is subjected during storage, and the activation volume for a demagnetizing field of 500 Oe (about 40 kA/m) were calculated by the following procedure with a superconducting electromagnet vibrating sample magnetometer (model TM-VSM1450-SM made by Tamagawa Co.) for the starting material BaFe and the magnetic particles prepared in Examples 1 to 3 and Comparative Example 1. In each measurement, the sample employed was 0.1 g of magnetic powder that was compacted in a measurement holder. The above measurements were not conducted for the magnetic particles prepared in Comparative Examples 2 and 3 because these magnetic particles exhibited excessively low coercive force, as shown in Table 2 below, and thus cannot be compared with the other magnetic particles as equals.

(i) Gradient of Decay of Magnetization Over Time

In the case of thermal fluctuation magnetic aftereffects, $\Delta M/(Int_1-Int_2)$ becomes constant in the decay of magnetization over time. Since magnetization also varies depending on the magnetic field, the gradient of the decay of magnetization over time was determined by measuring the magnetization once each increment of time after the magnetic field had been stabilized.

Specifically, an external magnetic field of 40 kOe (about 3,200 kA/m) was applied to the sample. Following direct-current erasure, the magnet was controlled by means of current and current was supplied to generate the target demagnetizing field. The external magnetic field was gradually brought closer to the target demagnetizing field. This was to prevent the decay of magnetization over time from appearing to decrease due to stable processing by varying the external magnetic field.

Designating the time when the magnetic field had reached the target value as the base point in measurement, the magnetization was measured for 25 minutes once every 1 minute and the gradient of the decay of magnetization over time $\Delta M/(Int_1-Int_2)$ was obtained. The results are given in Table 2. In Table 2, the value given was obtained by dividing $\Delta M/(Int_1-Int_2)$ by the magnetization in a 40 kOe external magnetic field and normalizing the result.

(ii) Activation Volume

The magnetization was calculated 25 minutes after the target demagnetizing field was reached by the same procedure as in (i) above for demagnetizing fields H1 (400 Oe) and H2 (600 Oe) differing only by 200 Oe (about 16 kA/m). These magnetization levels were denoted as $M_B$ and $M_E$, respectively, giving a total magnetization rate of $Xtot=(M_B-M_E)/\Delta H=(M_B-M_E)/200$.

Next, reversible magnetization rate Xrev was obtained from $Xrev=(M_F-M_E)/\Delta H=(M_F-M_E)/200$ by calculating the magnetization $M_F$ when the external magnetic field from H2 was increased by 200 Oe.

Irreversible magnetization rate (Xirr) was obtained from Xirr=Xtot−Xrev.

The activation volume (Vact) was calculated from $Vact=kT/(Ms(\Delta M/Xirr(Int_1-Int_2)))$. In the above equation, k: Boltzmann constant; T: temperature; Ms: saturation magnetization of the sample.

Based on the above step, the activation volume was obtained at a demagnetization field of 500 Oe. The results are given in Table 2.

(5) Confirmation of the Presence of Carbon Components

The magnetic particles prepared in Examples 1 to 3 and Comparative Examples 1 and 2 were subjected to surface composition analysis by an X-ray diffractometer. The characteristic peak of graphite was observed at $2\theta=26.5°$ with CuKα rays in the magnetic particles of Examples 1 to 3. The adhesion of graphite to the surfaces of the magnetic particles prepared in Examples 1 to 3 was confirmed based on these results. By contrast, the characteristic peak of graphite was not observed in the magnetic particles prepared in Comparative Examples 1 and 2.

(6) Confirmation and Quantification of the Presence of α-Fe

Among the X-ray diffraction spectra obtained in (5) above, the X-ray diffraction spectra of the magnetic particles prepared in Examples 1 to 3 and Comparative Example 2, an α-Fe peak was observed at $2\theta=45°$ with CuKα rays. By contrast, the α-Fe peak was not observed in the X-ray diffraction spectra of the magnetic particle prepared in Comparative Example 1.

Accordingly, multiple samples comprised of mixed commercial α-Fe standard product and starting material BaFe particles were prepared while varying the quantity of α-Fe that was admixed. These samples were analyzed by an X-ray diffractometer and the peak intensities of α-Fe and BaFe were compared to prepare a calibration curve. The calibration curve thus obtained was then used to quantify the quantity of α-Fe contained in the various magnetic particles based on the intensity of the α-Fe peak in the X-ray diffraction spectrum obtained in (5). The α-Fe quantity in the present invention refers to the value calculated by the above method.

The quantification results obtained are given in Table 3 along with the analysis results of (5) above.

TABLE 1

| $S_{BET}$ (m²/g) | Average plate diameter (nm) | Average plate thickness (nm) | Average particle volume (nm³) |
|---|---|---|---|
| 81.7 | 19.5 | 6.7 | 1642 |

TABLE 2

| | Reducing atmosphere gas (unit:vol %) | Heat-Treatment temperature | Period of heat-treatment | Coercive force | Saturation magnetization | Gradient of decay of magnetization over time (1/ln(s)) | Activation volume (nm³) |
|---|---|---|---|---|---|---|---|
| Ex. 1 | 4% CH₄ + 96% N₂ | 350° C. | 1 h | 229 kA/m (2875 Oe) | 4.3 × 10⁻² A · m²/g (43 emu/g) | 0.0020 | 2500 |
| Ex. 2 | 4% CH₄ + 96% N₂ | 350° C. | 2 h | 223 kA/m (2800 Oe) | 4.3 × 10⁻² A · m²/g (43 emu/g) | 0.0023 | 2600 |
| Ex. 3 | 4% C₂H₆ + 96% N₂ | 350° C. | 1 h | 227 kA/m (2850 Oe) | 4.4 × 10⁻² A · m²/g (44 emu/g) | 0.0020 | 2400 |
| Comp. Ex. 1 | 100% N₂ | 350° C. | 1 h | 233 kA/m (2925 Oe) | 4.4 × 10⁻² A · m²/g (44 emu/g) | 0.0022 | 2500 |

TABLE 2-continued

|  | Reducing atmosphere gas (unit:vol %) | Heat-Treatment temperature | Period of heat-treatment | Coercive force | Saturation magnetization | Gradient of decay of magnetization over time (1/ln(s)) | Activation volume (nm³) |
|---|---|---|---|---|---|---|---|
| Comp. Ex. 2 | 10% CO + 90% N$_2$ | 350° C. | 1 h | 4.0 kA/m (50 Oe) | 3.3 × 10$^{-2}$ A·m²/g (33 emu/g) | — | — |
| Comp. Ex. 3 | 100% H$_2$ | 350° C. | 1 h | 40 kA/m (500 Oe) | 3.0 × 10$^{-2}$ A·m²/g (30 emu/g) | — | — |
| Starting material BaFe | — | — | — | 235 kA/m (2950 Oe) | 4.5 × 10$^{-2}$ A·m²/g (45 emu/g) | 0.0024 | 2600 |

TABLE 3

|  | Detection of carbon component (graphite) by X-ray diffraction | Results of α-Fe quantification by X-ray diffraction |
|---|---|---|
| Ex. 1 | Detected | 0.5 weight % |
| Ex. 2 | Detected | 0.5 weight % |
| Ex. 3 | Detected | 0.5 weight % |
| Comp. Ex. 1 | Not detected | 0 weight % (not detected) |
| Comp. Ex. 2 | Not detected | 4.0 weight % |

In Table 2, in Comparative Example 2, which was heat-treated in atmosphere containing reducing gas in the form of CO, and in Comparative Example 3, which was heat-treated in atmosphere comprised of reducing gas in the form of hydrogen gas, the decrease in coercive force and the decrease in saturation magnetization relative to the starting material BaFe were marked. This was surmised to have occurred as follows. Since reduction processing was conducted in atmosphere that did not contain hydrocarbon gas, the reduction processing progressed to the interior portion of the hexagonal ferrite magnetic material. As a result, the crystalline structure of the hexagonal ferrite magnetic material changed (was destroyed). Additionally, the magnetic particle of Comparative Example 1, which was heat-treated in atmosphere comprised of inert gas in the form of nitrogen, exhibited a coercive force roughly identical to that of the starting material BaFe. Thus, it was understood that the coercive force of the hexagonal ferrite magnetic material could not be improved by simple heat-treatment.

By contrast, in Examples 1 to 3, which were heat-treated in a stream of reducing atmosphere gas containing hydrocarbon gas, the coercive force of the magnetic particles obtained was adjusted to within the range suitable for recording. An examination of the results given in Tables 2 and 3 reveals that hexagonal ferrite in which both α-Fe and carbon components (graphite) were detected by X-ray diffraction analysis was confirmed to have a coercive force suited to recording.

With regard to the thermal stability of the magnetic particle, the gradient of decay of magnetization over time measured by the above method is an index of the thermal stability of the magnetic particle. As shown in Table 2, the gradient of decay of magnetization over time of the magnetic particles of Examples 1 to 3 was nearly equivalent to those of the starting material BaFe and Comparative Example 1, which was heat-treated in atmosphere comprised of nitrogen gas. Thus, heat-treatment in reducing atmosphere containing hydrocarbon gas was determined to maintain good thermal stability in the magnetic particles without loss of high thermal stability of the starting material BaFe. When the thermal stability of the magnetic particle contained in the magnetic layer of the magnetic recording medium is low, it is difficult for energy (magnetic energy) of the magnetic particle for keeping the magnetization orientation to resist thermal energy. As a result, recorded signals decay over time (magnetization decay) and thus reliability of the reproduction signals are deteriorated. Therefore, in order to improve the reliability of the magnetic recording medium, it is required to employ magnetic particles having high thermal stability capable of maintaining recorded signals without significant decay. From the perspective of maintaining recorded signals, a magnetic particle with a gradient of decay of magnetization over time measured by the above method of equal to or less than 0.005 (1/ln(s)) is desirable, and equal to or less than 0.003 (1/ln(s)) is preferred. The lower this gradient is better from the perspective of maintaining recorded signals. Thus, the optimum lower limit is 0.000 (1/ln(s)). However, even above 0.001 (1/ln(s)), a good practical ability to maintain recorded signals will be present in a normal use environment.

Further, the activation volume shown in Table 2 is an index of the presence or absence of aggregation. If aggregation were to have been present, a change would have appeared in the thousands place or higher. However, as shown in Table 2, the activation volumes of Examples 1 to 3 were nearly equivalent to those of the starting material BaFe and Comparative Example 1, which was heat-treated in atmosphere comprised of nitrogen gas. From these results, it can be determined that no aggregation was produced in the heat-treatment in reducing atmosphere containing hydrocarbon gas.

The gradient of decay of magnetization over time is an index of the thermal stability of a magnetic particle. This gradient sometimes increases when the temperature is varied. This is thought to occur because raising the temperature reverses the spin of a portion of the interior of the magnetic material, increasing the demagnetizing field by that amount. The fact that the gradient increases when the temperature is varied, that is, the drop in thermal stability, is undesirable. Accordingly, to evaluate the presence of high long-term thermal stability, the magnetic particles of Examples 1 to 3 were evaluated by the following method. The difference (B−A) in the decay rates as measured by the following method desirably falls within a range of 0.0001 to 0.001, preferably within a range of 0.0001 to 0.0005. Within these ranges, good long-term thermal stability is present and the determination can be made that recorded signals will be well maintained even if a change in temperature occurs during storage.

Measurement Method

Magnetization was saturated with an external magnetic field of 40,000 Oe (about 3,184 kA/m) at a temperature of 300 K. Subsequently, the external magnetic field was changed to −600 Oe (about 48 kA/m). Decay rate A was evaluated based on the time (20 minutes after the external magnetization magnetic field was changed to −600 Oe) at which the demagnetizing field reaches 600 Oe (about 48 kA/m).

Subsequently, the magnetic particle of which the decay rate A had been measured was heated to 320 K at a rate of temperature increase of 5° C./minute and maintained for 10 minutes at that temperature (320 K). The temperature was then decreased to 300 K at a rate of 5° C./minute. Subsequently, in the same manner as above, the magnetization was saturated with an external magnetic field of 40,000 Oe (about 3,184 kA/m), the external magnetic field was changed to −600 Oe (about 48 kA/m), and decay rate B was evaluated based on the time at which the demagnetizing field reaches 600 Oe (about 48 kA/m).

Table 4 gives the results obtained. As shown in Table 4, the difference in the decay rates (B-A) of the magnetic particles obtained in Examples 1 to 3 fell within the above desirable range. Thus, they were determined to have good long-term thermal stability.

TABLE 4

| | Difference in decay rates (B − A) |
|---|---|
| Ex. 1 | 0.0008 |
| Ex. 2 | 0.0007 |
| Ex. 3 | 0.0004 |

Based on the above evaluation results, the magnetic particles obtained by heat-treatment in reducing atmosphere containing hydrocarbon gas had good thermal stability and were microparticles nearly equivalent to the hexagonal ferrite magnetic material prior to heat-treatment. Thus, they were determined to be suitable for high-density recording. In addition, hexagonal ferrite in which both α-Fe and hydrocarbon components (graphite) were detected by X-ray diffraction analysis were determined to have coercive force suited to recording and good thermal stability.

2. Examples and Comparative Examples of Magnetic Recording Media

Examples 4, 5

(1) Formulation of Magnetic Layer Coating Liquid

| | |
|---|---|
| Magnetic particle described in Table 5 | 100 parts |
| Polyurethane resin based on branched side chain-comprising polyester polyol/diphenylmethane diisocyanate, —SO$_3$Na = 400 eq/ton | 15 parts |
| α-Al$_2$O$_3$ (particle size: 0.15 μm) | 4 parts |
| Plate-shaped alumina powder (average particle diameter: 50 nm) | 0.5 part |
| Diamond powder (average particle diameter: 60 nm) | 0.5 part |
| Carbon black (particle size: 20 nm) | 1 part |
| Cyclohexanone | 110 parts |
| Methyl ethyl ketone | 100 parts |
| Toluene | 100 parts |
| Butyl stearate | 2 parts |
| Stearic acid | 1 part |

(2) Formulation of Nonmagnetic Layer Coating Liquid

| | |
|---|---|
| Nonmagnetic inorganic powder α-iron oxide | 85 parts |
| Surface treatment agent: Al$_2$O$_3$, SiO$_2$ | |
| Major axis diameter: 0.15 μm | |
| Tap density: 0.8 | |
| Acicular ratio: 7 | |
| BET specific surface area: 52 m$^2$/g | |
| pH: 8 | |
| DBP oil absorption capacity: 33 g/100 g | |
| Carbon black | 15 parts |
| DBP oil absorption capacity: 120 mL/100 g | |
| pH: 8 | |
| BET specific surface area: 250 m$^2$/g | |
| Volatile content: 1.5 percent | |
| Polyurethane resin based on branched side chain-comprising polyester polyol/diphenylmethane diisocyanate, —SO$_3$Na = 200 eq/ton | 22 parts |
| Phenylphosphonic acid | 3 parts |
| Cyclohexanone | 140 parts |
| Methyl ethyl ketone | 170 parts |
| Butyl stearate | 2 part |
| Stearic acid | 1 part |

(3) Formulation of Backcoat Layer Coating Liquid

| | |
|---|---|
| Carbon black (average particle diameter: 25 nm) | 40.5 parts |
| Carbon black (average particle diameter: 370 nm) | 0.5 part |
| Barium sulfate | 4.05 parts |
| Nitrocellulose | 28 parts |
| SO$_3$Na group-containing polyurethane resin | 20 parts |
| Cyclohexanone | 100 parts |
| Toluene | 100 parts |
| Methyl ethyl ketone | 100 parts |

(4) Preparation of Coating Liquid for Forming Each Layer

The components of each of the above-described magnetic layer coating liquid, nonmagnetic layer coating liquid, and backcoat layer coating liquid were kneaded for 240 minutes in an open kneader and dispersed using a bead mill (1,440 minutes for the magnetic layer coating liquid, 720 minutes for the nonmagnetic layer coating liquid, and 720 hours for the backcoat layer coating liquid). To each of the dispersions obtained were added four parts of trifunctional low-molecular-weight polyisocyanate compound (Coronate 3041 made by Nippon Polyurethane Industry Co.), and the mixtures were stirred for another 20 minutes. Subsequently, the mixtures were filtered using a filter having an average pore diameter of 0.5 μm. The magnetic layer coating liquid was then centrifugally separated for 30 minutes at a rotational speed of 10,000 rpnm in a cooled centrifugal separator, the Himac CR-21D, made by Hitachi High Tech, to conduct grading to remove the aggregate.

(5) Preparation of Magnetic Tape

The nonmagnetic layer coating liquid obtained was coated to a PEN support with a thickness of 5 μm (an average surface roughness Ra=1.5 nm as measured with an HD2000 made by WYKO) in a quantity calculated to yield a dry thickness of 1.5 μm, and dried at 100° C. The support stock material on which the nonmagnetic layer had been coated was then subjected to a 24-hour heat treatment at 70° C. The magnetic layer coating liquid that had been graded was wet-on-dry coated on the nonmagnetic layer in a quantity calculated to yield the thickness of 20 nm upon drying and dried at 100° C. On the surface of the support opposite to the surface on which the magnetic layer has been provided, the backcoat layer coating liquid was coated and dried to yield a backcoat layer with a thickness of 0.5 μm.

A seven-stage calender comprised only of metal rolls was then used to conduct processing to smoothen the surface at a temperature of 100° C. and a linear pressure of 350 kg/cm at a speed of 100 m/min. The material was then slit into a ½ inch width to obtain magnetic tape.

With the exception that the starting material BaFe employed in 1. above (i.e., Examples and Comparative Examples of magnetic particles) was employed as a magnetic particle, magnetic tapes were prepared in the same manner as in Examples 4 and 5.

(6) Evaluation of Magnetic Tapes (6-1) Coercive Force

It was evaluated under conditions of an applied magnetic field of 3,184 kA/m (40 kOe) with a superconducting vibrating sample magnetometer (VSM) made by Tamagawa Co.

(6-2) Electromagnetic Characteristics (ORC, SNR)

Measurement of electromagnetic characteristics was conducted with a drum tester (relative speed 5 m/s).

1) ORC

A write head with a gap length of 0.2 μm and Bs=1.6 T was used to record a signal at a linear recording density of 275 kfci. The signal was reproduced with a GMR head (Tw width 3 μm, sh-sh=0.18 μm). The recording current was changed and current at which output was maximum was applied as an optimal recording current (ORC).

2) SNR

Under the condition described in 1) above, signals were recorded and reproduced at the optimal recording current obtained in 1) above. The ratio of the 275 kfci output to 0 to 2×275 kfci integral noise was measured.

Results are given in Table 5. The SNR shown in Table 5 is a relative value based on the measured value of Comparative Example 3.

TABLE 5

|  | Magnetic particle | Coercive force of medium | ORC (mA) | SNR (dB) |
|---|---|---|---|---|
| Ex. 4 | Ex. 2 | 248 kA/m (3120 Oe) | 14.3 | 0.9 |
| Ex. 5 | Ex. 3 | 255 kA/m (3200 Oe) | 14.5 | 0.7 |
| Comp. Ex. 3 | Starting material BaFe | 267 kA/m (3360 Oe) | 15.5 | 0 |

As shown in Tables 2 and 4 above, magnetic particles of Examples 2 and 3 had high thermal stability. As shown in Table 5, magnetic tapes prepared with these magnetic particles exhibited higher SNR with lower recording current than the magnetic tape of Comparative Example 3 prepared with the starting material BaFe.

From the above results, it was revealed that the present invention could provide magnetic particles having both high thermal stability and excellent recording properties and that, with the use of such magnetic particles, magnetic recording media having both high reliability and excellent recording properties can be provided.

The magnetic particle of the present invention is suitable for use in inexpensive particulate magnetic recording media.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic particle, which is obtained by heat-treating a hexagonal ferrite magnetic material having a coercive force of equal to or higher than 230 kA/m in a reducing atmosphere containing a hydrocarbon gas.

2. The magnetic particle according to claim 1, which comprises a carbon component.

3. The magnetic particle according to claim 2, wherein the carbon component is graphite.

4. The magnetic particle according to claim 1, wherein the reducing atmosphere is a mixed gas atmosphere of a hydrocarbon gas and an inert gas.

5. The magnetic particle according to claim 4, wherein the hydrocarbon gas is at least one selected from the group consisting of methane and ethane.

6. The magnetic particle according to claim 1, which has a coercive force of equal to or higher than 120 kA/m but less than 230 kA/m.

7. The magnetic particle according to claim 1, which has thermal stability in the form of a gradient of decay of magnetization over time of equal to or less than 0.005 (1/ln(s)).

8. The magnetic particle according to claim 1, which has thermal stability in the form of a difference of a decay rate A and a decay rate B, B−A, ranging from 0.0001 to 0.001, wherein the decay rate A is measured by saturating magnetization of the magnetic particle with an external magnetic field of 40,000 Oe at a temperature of 300 K, subsequently changing the external magnetic field to −600 Oe, and measuring the decay rate based on a time at which a demagnetizing field reaches 600 Oe, and the decay rate B is measured by heating the magnetic particle of which the decay rate A has been measured to 320 K at a rate of temperature increase of 5° C/minute, maintaining the magnetic particle for 10 minutes at that temperature, subsequently cooling the magnetic particle to 300 K at a rate of temperature decrease of 5° C/minute, and measuring the decay rate by the same method as that of the decay rate A.

9. A magnetic particle, which is comprised of a hexagonal ferrite magnetic material in which α-Fe and a carbon component are detected by X-ray diffraction analysis, and which has a coercive force of equal to or higher than 120 kA/m but less than 230 kA/m.

10. The magnetic particle according to claim 9, wherein a quantity of α-Fe detected by X-ray diffraction ranges from 0.2 to 1.0 weight percent.

11. The magnetic particle according to claim 9, wherein the carbon component is graphite.

12. The magnetic particle according to claim 9, which has thermal stability in the form of a gradient of decay of magnetization over time of equal to or less than 0.005 (1/ln(s)).

13. The magnetic particle according to claim 9, which has thermal stability in the form of a difference of a decay rate A and a decay rate B, B−A, ranging from 0.0001 to 0.001, wherein the decay rate A is measured by saturating magnetization of the magnetic particle with an external magnetic field of 40,000 Oe at a temperature of 300 K, subsequently changing the external magnetic field to −600 Oe, and measuring the decay rate based on a time at which a demagnetizing field reaches 600 Oe, and the decay rate B is measured by heating the magnetic particle of which the decay rate A has been measured to 320 K at a rate of temperature increase of 5° C/minute, maintaining the magnetic particle for 10 minutes at that temperature, subsequently cooling the magnetic particle to 300 K at a rate of temperature decrease of 5° C/minute, and measuring the decay rate by the same method as that of the decay rate A.

14. A method of preparing a magnetic particle, which comprises heat-treating a hexagonal ferrite magnetic material having a coercive force of equal to or higher than 230 kA/m in a reducing atmosphere containing a hydrocarbon gas.

15. The method of preparing a magnetic particle according to claim 14, wherein the reducing atmosphere is a mixed gas atmosphere of a hydrocarbon gas and an inert gas.

16. The method of preparing a magnetic particle according to claim 14, wherein the hydrocarbon gas is at least one selected from the group consisting of methane and ethane.

17. The method of preparing a magnetic particle according to claim 14, wherein the heat-treatment yields a magnetic particle having a coercive force lower than that of the hexagonal ferrite magnetic material prior to the heat-treatment.

18. The method of preparing a magnetic particle according to claim 14, wherein the heat-treatment yields a magnetic particle having a coercive force of equal to or higher than 120 kA/m but less than 230 kA/m.

19. The method of preparing a magnetic particle according to claim 14, wherein the heat-treatment is conducted at a temperature ranging from 200 to 400° C.

20. A magnetic recording medium comprising a magnetic layer comprising a ferromagnetic powder and a binder, wherein the ferromagnetic powder comprises the magnetic particle according to claim 9.

* * * * *